United States Patent
de Brebisson

(10) Patent No.: US 7,093,089 B2
(45) Date of Patent: Aug. 15, 2006

(54) SYSTEMS AND METHODS FOR STORING DATA ON COMPUTER SYSTEMS

(75) Inventor: Cyrille de Brebisson, Boise, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 310 days.

(21) Appl. No.: 10/643,138

(22) Filed: Aug. 18, 2003

(65) Prior Publication Data

US 2005/0044332 A1   Feb. 24, 2005

(51) Int. Cl.
*G06F 12/02* (2006.01)

(52) U.S. Cl. ............... 711/162; 711/103; 711/104; 711/158

(58) Field of Classification Search ........ 711/161–162, 711/103–104, 158
See application file for complete search history.

(56) References Cited

U.S. PATENT DOCUMENTS

| | | | |
|---|---|---|---|
| 5,778,443 A * | 7/1998 | Swanberg et al. ......... 711/162 |
| 5,784,628 A * | 7/1998 | Reneris ...................... 713/300 |
| 5,845,134 A | 12/1998 | Arai |
| 6,145,068 A * | 11/2000 | Lewis ........................ 711/170 |
| 6,546,472 B1 * | 4/2003 | Atkinson et al. ........... 711/156 |
| 6,552,672 B1 | 4/2003 | Ghildiyal et al. |
| 6,609,182 B1 * | 8/2003 | Pedrizetti et al. .......... 711/159 |
| 6,647,472 B1 * | 11/2003 | Atkinson et al. ........... 711/158 |
| 6,883,037 B1 * | 4/2005 | Kadatch et al. ............... 710/5 |
| 2004/0003223 A1 * | 1/2004 | Fortin et al. .................... 713/1 |
| 2004/0064647 A1 * | 4/2004 | DeWhitt et al. ............ 711/135 |

* cited by examiner

Primary Examiner—Matthew Kim
Assistant Examiner—Hetul Patel

(57) ABSTRACT

Methods for storing data on computer systems are provided. An embodiment of a method comprises: identifying a first portion of volatile memory of a computer system that is being used to store data; identifying a second portion of the volatile memory that is not being used to store data; and in response to an input corresponding to a power-off condition of the computer system, saving the data corresponding to the first portion of the volatile memory in the non-volatile memory without saving the second portion of the volatile memory in the non-volatile memory. Systems also are provided.

13 Claims, 3 Drawing Sheets

SYSTEMS AND METHODS FOR STORING DATA ON COMPUTER SYSTEMS

BACKGROUND

Computer systems typically include a combination of volatile and non-volatile memory. Since volatile memory loses its state when power is removed, some computer systems save all data stored in volatile memory to non-volatile memory in response to a power-off condition. For example, when a user initiates hybernate of a computer system, the data saved on the main random access memory (RAM) of the system is saved to the system hard drive.

In many computer systems, the volatile memory is allocated for multiple uses. For example, half of the storage capacity may be allocated for user data, one quarter of the storage capacity may be unused, and the remaining quarter of storage capacity may be allocated as disk cache. Of the portion of the volatile memory that is allocated for disk cache, typically one half of this storage capacity is designated for being written to the system hard drive. Thus, in some computer systems, the entire volatile memory, including the unused portion and that portion of the disk cache designated for being written to the hard drive, is written to the system hard drive in response to a power-off condition.

SUMMARY

Systems and methods for storing data on computer systems are provided. An embodiment of a method comprises: identifying a first portion of volatile memory of a computer system that is being used to store data; identifying a second portion of the volatile memory that is not being used to store data; and in response to an input corresponding to a power-off condition of the computer system, saving the data corresponding to the first portion of the volatile memory in the non-volatile memory without saving the second portion of the volatile memory in the non-volatile memory.

Another embodiment of a method comprises: identifying first data stored in the volatile memory that is at least one of: a) not also stored in the non-volatile memory; and b) not disk cache; and in response to a power-off condition of the computer system, saving the first data in the non-volatile memory.

An embodiment of a computer system comprises: volatile memory; non-volatile memory; and a power-off memory back-up system operative to: identify a first portion of the volatile memory that is being used to store data; identify a second portion of the volatile memory that is not being used to store data; and save the data corresponding to the first portion of the volatile memory in the non-volatile memory without saving the second portion of the volatile memory in the non-volatile memory in response to an input corresponding to a power-off condition of the computer system.

Other systems, such as computer-readable media having computer programs for performing computer-implemented methods on computer systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

As will described in detail here, systems and methods for storing data on computer systems can potentially reduce the amount of time taken for backing-up memory when storing data from volatile memory to non-volatile memory. Embodiments of the present invention can potentially reduce the amount of time taken to place a computer system back into a working state after the memory has been backed-up. Back-up may be accomplished by identifying data stored in the volatile memory that should be backed-up and then saving the identified data to non-volatile memory. By selecting the data that is to be saved to non-volatile memory, the amount of data being saved in response to a power-off condition, for example, can be reduced. Consequently, non-volatile memory storage devices that have reduced storage capacity, reduced time-to-save operating speeds and/or reduced expense can be used.

Figure 1:
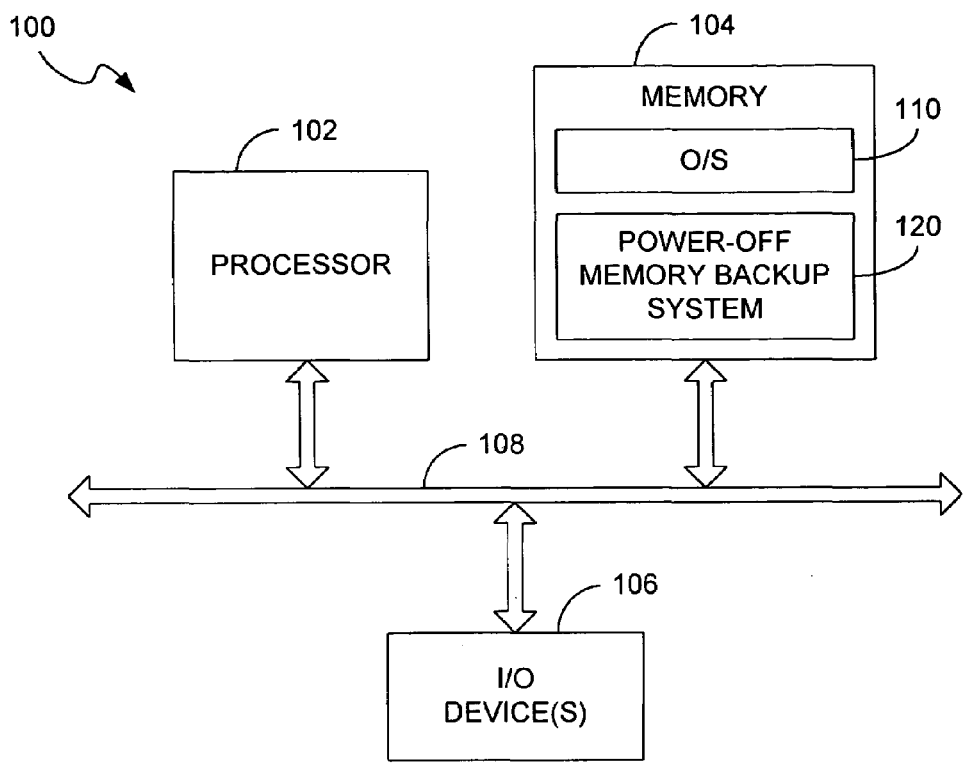
FIG. 1 is a schematic diagram of a computer system that can be used to implement an embodiment of a power-off memory back-up system.

An example computer system will now be described that can be used to implement an embodiment of a power-off memory back-up system. As shown in FIG. 1, computer system 100 includes a processor 102, memory 104, and one or more input and/or output (I/O) devices 106 (or peripherals) that are communicatively coupled via a local interface 108. The software in memory 104 can include one or more separate programs, each of which comprises an ordered listing of executable instructions for implementing logical functions. In the example of FIG. 1, the software in the memory 104 includes an operating system (O/S) 110 and an embodiment of a power-off memory back-up system 120.

When power-off memory back-up system 120 is implemented in software, the system can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. A power-off memory back-up system 120 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Figure 2:
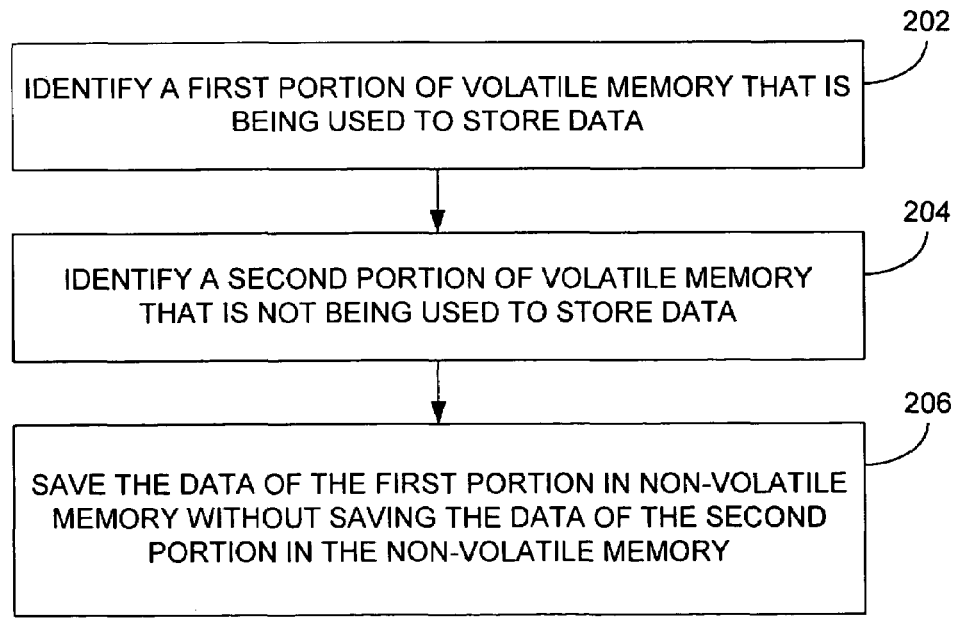
FIG. 2 is a flowchart depicting functionality of an embodiment of a power-off memory back-up system.

Functionality of power-off memory back-up system 120 will now be described with respect to the flowchart of FIG. 2. As shown in FIG., 2, the functionality (or method) may be construed as beginning at block 210, where a first portion of volatile memory is identified that is being used to store data. In block 220, a second portion of the volatile memory is identified that is not being used to store data. In block 230, data being stored by the first portion of the volatile memory is saved in non-volatile memory without saving the data being stored by the second portion of the volatile memory in the non-volatile memory. In one exemplary embodiment, the data is saved to the non-volatile memory in response to a power-off condition of the computer system in which the data is saved.

As mentioned before, in some computer systems, it is common to copy the entire memory image from volatile memory to non-volatile memory when performing a memory back-up. By identifying portions of volatile memory that are not being used to store data and then not copying these unused portions to non-volatile memory, the back-up operation can occur more quickly. Also, less memory can be used. Therefore, a memory storage device with lower memory capacity can be used. Additionally or alternatively, a memory storage device with lower operating speed can be used since less data typically is written during a back-up operation. Clearly, devices with lower performance and/or lower storage capacity typically can be provided at lower cost than devices that exhibit higher operating performance and/or higher storage capacity.

Figure 3:
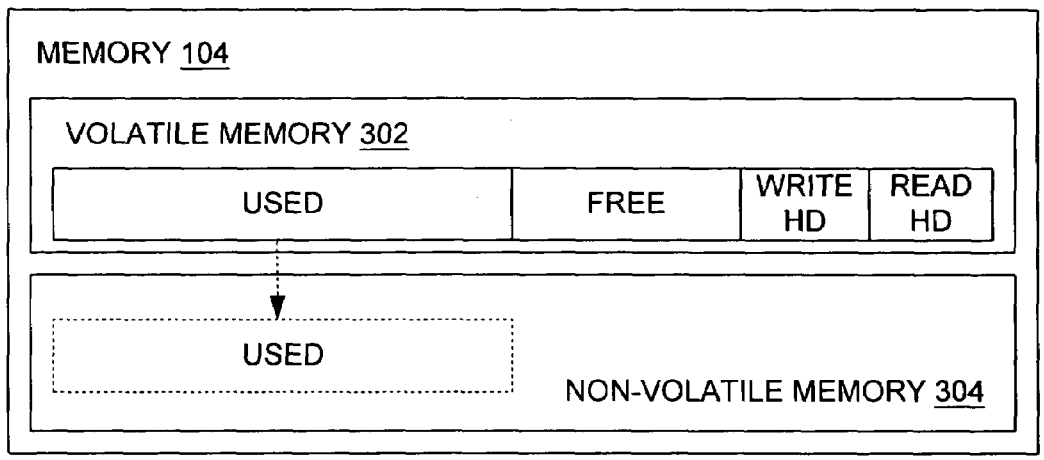
FIG. 3 is a schematic diagram depicting the memory of FIG. 1, showing data from volatile memory being stored to non-volatile memory in response to a power-off condition.
Figure 4:
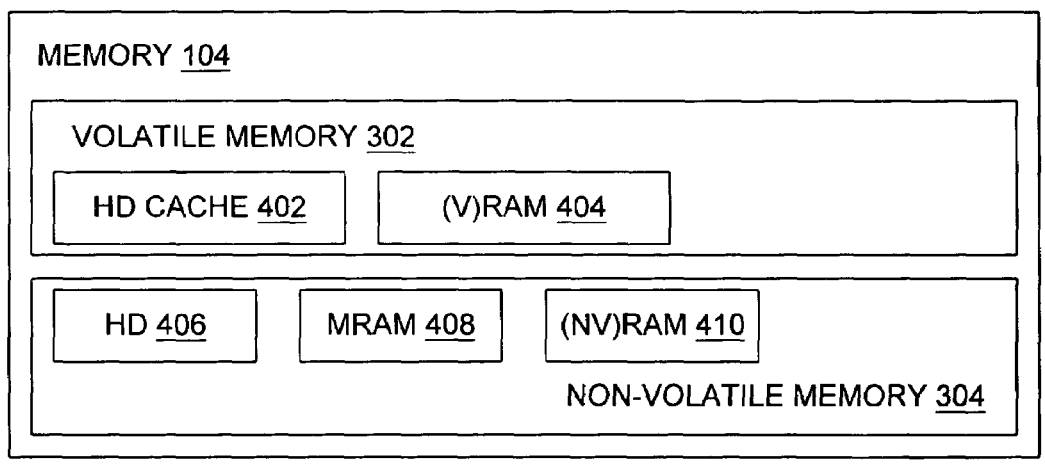
FIG. 4 is a schematic diagram of the memory of the computer system of FIG. 1, showing multiple data storage devices.

FIG. 3 is a schematic diagram depicting the memory 104 of FIG. 1 in greater detail. As shown in FIG. 3, memory 104 includes volatile memory 302 and non-volatile memory 304. As shown in FIG. 4, volatile memory 302 and non-volatile memory 304 each include multiple portions of memory, each of which can be associated with a separate storage device. Specifically, volatile memory 302 includes a hard disk cache 402 and a volatile RAM device 404. The non-volatile memory 304 includes a hard disk 406, MRAM memory storage device 408 and a non-volatile RAM device 410.

When implemented in a computer system such as system 100 of FIG. 1, a power-off memory back-up system can cause data to be saved from one or more storage devices that store volatile memory to one or more storage devices that store non-volatile memory. With respect to the embodiment of FIG. 1, this can include saving data stored in volatile RAM device 404 to MRAM memory storage device 408 and/or non-volatile RAM device 410.

When data stored in volatile memory is to be saved to non-volatile memory, some embodiments of the power-off memory back-up system cause only user data to be copied to non-volatile memory. Thus, the entire volatile memory image, which typically includes free or unused portions of the volatile memory as well as disk cache, is not saved to non-volatile memory. Clearly, a potentially significant reduction in data that is to be stored can be achieved.

Figure 5:
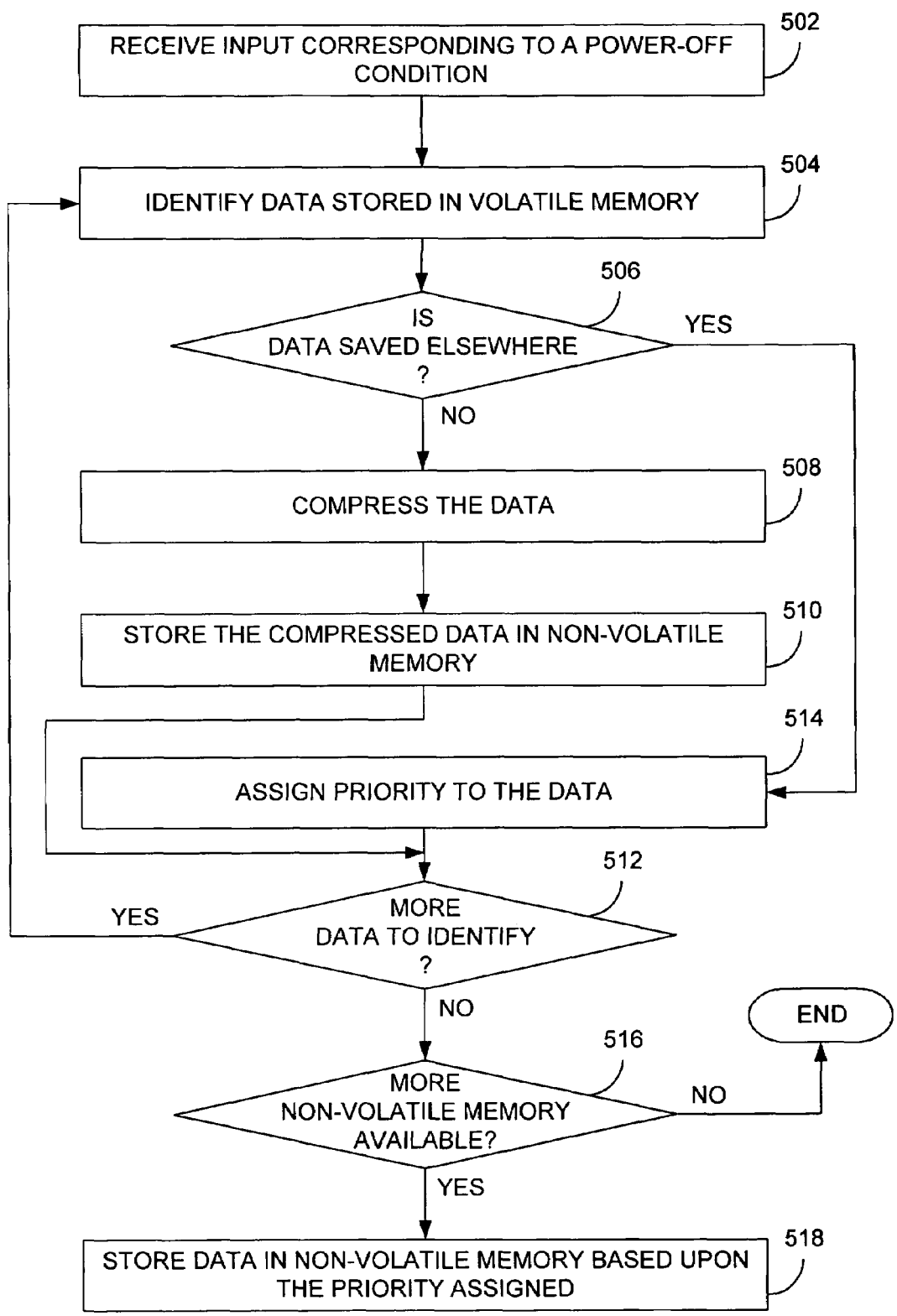
FIG. 5 is a flowchart depicting functionality of another embodiment of a power-off memory back-up system.

Functionality of another embodiment of a power-off memory back-up system will now be described with respect to the flowchart of FIG. 5. As shown in FIG. 5, the functionality (or method) may be construed as beginning at block 502, where an input corresponding to a power-off condition is received. By way of example, such an input could include information corresponding to a user initiating a shutdown process of a computer system.

In block 504, data stored in volatile memory is identified. By way of example, the operating system of the computer system can be used to identify which data is in use, or is not in use. Additionally or alternatively, a memory management unit (MMU) of a computer system can be used to determine which portions of memory are allocated and used, allocated and not used and/or unallocated. The disk cache of a computer system also could be used to identify data. This is because the disk cache typically handles a large portion of memory and contains information corresponding to a characteristic of each memory region, e.g., whether the data is a copy of existing data.

In block 506, a determination is made as to whether the data that was previously identified is saved and/or is designated to be saved elsewhere by the computer system. By way of example, a determination can be made as to whether the identified data is saved in ROM or is to be saved to hard disk, as is the case with the write portion of disk cache. If it is determined in block 506 that the data is not saved or is not designated to be saved elsewhere, the process proceeds to block 508. In block 508, the identified data is compressed. Then, in block 510, the compressed data is stored in non-volatile memory. Note that, in some embodiments, the identified data can be stored in non-volatile memory without being compressed.

In block 512, a determination is made as to whether there is more data in volatile memory to identify. If there is more data to identify, the process returns to block 504 and proceeds as described previously.

If it was determined in block 506 that the identified data is saved or is designated to be saved elsewhere, the process proceeds to block 514, where a priority level is assigned to the identified data. Once again, the process proceeds to block 512 to determine whether there is more data to identify. Once it is determined that no more data exists to be identified, the process proceeds to block 516. In block 516, a determination is made as to whether any more non-volatile memory is available for data storage. If it is determined that more non-volatile memory is available, the process proceeds to block 518. In block 518, data is stored in the non-volatile memory based upon the priority level previously assigned. Thus, data identified as not being saved or designated to be saved elsewhere is saved to non-volatile memory and, then, if there is additional memory available, additional data can be saved in the non-volatile memory based upon the assigned priority level.

Priority can be assigned to data based on one or more of various factors, such as the relative importance of the data, the relative quality of the location in which the data could be stored, and/or the system architecture. For example, in an MMU-based system, RAM data could be evaluated based on the following criteria: Is the memory used? Is it disk cache? If it is disk cache, is that data already saved on hard disk? If it is not disk cache, is it system data? Is it application data indirectly used through MMU? When is the last time that this data was used? Then, depending upon the answers, the data can be saved or not. For instance, the data can be dropped (not saved), committed to hard disk and/or saved (and possibly compressed) in non-volatile memory.

Note that if the non-volatile memory to which data is to be stored is a hard drive, and the data identified by the power-off memory back-up system is currently stored by the hard drive, it may be preferable to store the identified data on the hard drive. However, if the non-volatile memory to which data is to be stored is a high-speed flash, it may be preferable to store the identified data on the high-speed flash.

Also note that the process of backing-up the identified data does not modify the content of the memory. Thus, a computer system can be returned to the state that it exhibited prior to initiation of the backing-up process. In some embodiments, the backing-up process can be interrupted, which also can return the computer system to the state that it exhibited prior to initiation of the backing-up process.

In order to return a computer system to the state that it exhibited prior to initiation of a backing-up process, data can be restored in RAM, and the computer system restarted. This is similar to, but can be faster than, hibernate techniques that are implemented on laptop computers, for example. Additionally or alternatively, using an MMU of a computer system, a reduced portion of the system can be loaded. For example, MMU default handlers, interrupt handlers, and MMU tables running in physical or system virtual address space can be loaded and the system then restarted. This would allow the system to restart and be usable with a small amount of memory, e.g., 200 KB of memory. Data could then be loaded on demand, such as by using the MMU exception error.

It should be emphasized that many variations and modifications may be made to the above-described embodiments. By way of example, in some embodiments, the functionality associated with one or more of the blocks of the flowcharts may occur out of the order in which depicted. All such modifications and variations are intended to be included herein within the scope of this disclosure and protected by the following claims.

The invention claimed is:

1. A method for storing data on a computer system, the computer system having volatile memory and non-volatile memory, the volatile memory comprising a volatile memory device, said method comprising:
   identifying a first portion of the volatile memory device that is being used to store data;
   identifying a second portion of the volatile memory device that is not being used to store data; and
   in response to an input corresponding to a power-off condition of the computer system, saving the data corresponding to the first portion of the volatile memory device in the non-volatile memory without saving the data corresponding to the second portion of the volatile memory device in the non-volatile memory
   identifying a third portion of the volatile memory that is being used to store data, a copy of the data corresponding to the third portion of the volatile memory also being stored in the non-volatile memory; and
   additionally saving the data corresponding to the third portion of the volatile memory in the non-volatile memory if the non-volatile memory has additional storage capacity remaining after allocating storage capacity for saving the data corresponding to the first portion of the volatile memory device;
   wherein a copy of the data corresponding to the first portion of the volatile memory device is not also stored in the non-volatile memory prior to the identifying step.

2. The method of claim 1, further comprising:
   compressing the data corresponding to the first portion of the volatile memory device as first compressed data; and
   wherein saving the data corresponding to the first portion of the volatile memory device comprises saving the first compressed data in the non-volatile memory.

3. The method of claim 1, wherein the volatile memory device does not include disk cache.

4. The method of claim 1, further comprising:
   identifying a third portion of the volatile memory that is being used to store data, the data corresponding to the third portion of the volatile memory also being at least one of:
      a) stored in the non-volatile memory; and
      b) disk cache;
   assigning priority to one of:
      a) the data corresponding to the second portion of the volatile memory device; and
      b) the data corresponding to the third portion of the volatile memory for storage in the non-volatile memory; and
   if the non-volatile memory has additional storage capacity remaining after allocating storage capacity for saving the data corresponding to the first portion of the volatile memory device, additionally saving at least one of the data corresponding to the second portion of the volatile memory device and the data corresponding to the third portion of the volatile memory in the non-volatile memory based upon the priority assigned.

5. A method for storing data on a computer system, the computer system having volatile memory and non-volatile memory, the volatile memory including disk cache, said method comprising:
   identifying first data stored in the volatile memory wherein at least one of:
      a) the first data is not also stored in the non-volatile memory; and
      b) the volatile memory is not disk cache; and
   in response to a power-off condition of the computer system, saving the first data in the non-volatile memory; and
   identifying second data stored in the volatile memory wherein at least one of:
      a) the second data is stored in the non-volatile memory; and
      b) the volatile memory is disk cache; and
   if the non-volatile memory has additional storage capacity remaining after allocating storage capacity for saving the first data, additionally saving the second data in the non-volatile memory.

6. The method of claim 5, further comprising:
   compressing the first data as first compressed data; and
   wherein saving the first data comprises saving the first compressed data in the non-volatile memory.

7. The method of claim 5, further comprising:
   compressing the second data as second compressed data; and
   wherein additionally saving the second data comprises saving the second compressed data in the non-volatile memory.

8. A computer system comprising:
   volatile memory;
   non-volatile memory; and
   a power-off memory back-up system operative to:
      identify a first portion of the volatile memory that is being used to store data;

identify a second portion of the volatile memory that is not being used to store data; and save the data corresponding to the first portion of the volatile memory in the non-volatile memory without saving the second portion of the volatile memory in the non-volatile memory in response to an input corresponding to a power-off condition of the computer system, wherein the power-off memory back-up system is further operative to:

identify a third portion of the volatile memory that is being used to store data, a copy of the data corresponding to the third portion of the volatile memory also being stored in the non-volatile memory; and additionally save the data corresponding to the third portion of the volatile memory in the non-volatile memory if the non-volatile memory has additional storage capacity remaining after allocating storage capacity for saving the data corresponding to the first portion of the volatile memory.

9. The computer system of claim 8, wherein:

the non-volatile memory comprises a hard drive;

the copy of the data corresponding to the third portion of the volatile memory is saved on the hard drive; and in additionally saving the data corresponding to the third portion of the volatile memory in the non-volatile memory, the power-off memory back-up system is operative to save the data corresponding to the third portion of the volatile memory to the hard drive.

10. The computer system of claim 8, wherein:

the non-volatile memory comprises a hard drive and a flash memory;

the copy of the data corresponding to the third portion of the volatile memory is saved on the hard drive; and in additionally saving the data corresponding to the third portion of the volatile memory in the non-volatile memory, the power-off memory back-up system is operative to save the data corresponding to the third portion of the volatile memory to the flash memory.

11. A computer-readable medium having a computer program for performing a computer-implemented method on a computer system having volatile memory and non-volatile memory, with the volatile memory including disk cache, said method comprising:

identifying first data stored in the volatile memory wherein at least one of:

a) the first data is not also stored in the non-volatile memory; and b) the volatile memory is not disk cache; and in response to a power-off condition of the computer system, saving the first data in the non-volatile memory;

identifying second data stored in the volatile memory wherein at least one of:

a) the second data is stored in the non-volatile memory; and b) the volatile memory is disk cache; and if the non-volatile memory has additional storage capacity remaining after allocating storage capacity for saving the first data, additionally saving the second data in the non-volatile memory.

12. The computer-readable medium of claim 11, said method further comprising:

compressing the first data as first compressed data; and wherein saving the first data comprises saving the first compressed data in the non-volatile memory.

13. The computer-readable medium of claim 11, said method further comprising:

compressing the second data as second compressed data; and wherein additionally saving the second data comprises saving the second compressed data in the non-volatile memory.

* * * * *

UNITED STATES PATENT AND TRADEMARK OFFICE
CERTIFICATE OF CORRECTION

| | | |
|---|---|---|
| PATENT NO. | : 7,093,089 B2 | Page 1 of 1 |
| APPLICATION NO. | : 10/643138 | |
| DATED | : August 15, 2006 | |
| INVENTOR(S) | : Cyrille de Brebisson | |

It is certified that error appears in the above-identified patent and that said Letters Patent is hereby corrected as shown below:

On the title page, item (73), in "Assignee", in column 1, line 2, delete "LP.," and insert -- L.P., --, therefor.

Signed and Sealed this

Twenty-third Day of June, 2009

JOHN DOLL
*Acting Director of the United States Patent and Trademark Office*